(12) United States Patent
Edward et al.

(10) Patent No.: US 9,983,037 B2
(45) Date of Patent: May 29, 2018

(54) FLUID SENSOR WITH A FLUID CONDUIT REGION OF COMPOSITE MATERIAL INCLUDING POLYMER MATRIX MATERIAL AND REINFORCING ELEMENTS

(71) Applicant: M-Flow Technologies Ltd, Abingdon (GB)

(72) Inventors: Giles Edward, Abingdon (GB); Alan David Parker, Abingdon (GB)

(73) Assignee: M-Flow Technologies Ltd, Abingdon (GB)

( * ) Notice: Subject to any disclaimer, the term of this patent is extended or adjusted under 35 U.S.C. 154(b) by 33 days.

(21) Appl. No.: 15/300,745

(22) PCT Filed: Mar. 31, 2015

(86) PCT No.: PCT/GB2015/051008
§ 371 (c)(1),
(2) Date: Sep. 29, 2016

(87) PCT Pub. No.: WO2015/150801
PCT Pub. Date: Oct. 8, 2015

(65) Prior Publication Data
US 2017/0016750 A1     Jan. 19, 2017

(30) Foreign Application Priority Data
Mar. 31, 2014  (GB) .................................. 1405713.7

(51) Int. Cl.
*G01F 1/66*     (2006.01)
*G01F 15/00*   (2006.01)
*G01F 15/14*   (2006.01)

(52) U.S. Cl.
CPC ............ *G01F 1/662* (2013.01); *G01F 15/006* (2013.01); *G01F 15/14* (2013.01)

(58) Field of Classification Search
None
See application file for complete search history.

(56) References Cited

U.S. PATENT DOCUMENTS 5,515,733 A     5/1996  Lynnworth
6,004,639 A *  12/1999  Quigley ................ B29C 70/086
                                                           138/125

(Continued)

FOREIGN PATENT DOCUMENTS

DE          41 43 509         7/1994
DE     10 2010046338      12/2011

(Continued)

*Primary Examiner* — Harshad R Patel
(74) *Attorney, Agent, or Firm* — Levy & Grandinetti (57) ABSTRACT

A fluid sensor comprises a fluid conduit having a wall defining a fluid flow path and an acoustic transducer located externally of the fluid flow path. The wall of the fluid conduit comprises a composite region between the acoustic transducer and the fluid flow path, the composite region comprising a composite material including a polymer matrix material and one or more reinforcing elements embedded within the polymer matrix material. Such a fluid sensor may be used for sensing a property of a fluid and, in particular though not exclusively for sensing a property of a fluid produced from or injected into an oil or gas well.

39 Claims, 7 Drawing Sheets

(56) References Cited

U.S. PATENT DOCUMENTS

| | | | |
|---|---|---|---|
| 8,714,030 | B1 | 5/2014 | Liu et al. |
| 2004/0050176 | A1 | 3/2004 | Ohnishi |

FOREIGN PATENT DOCUMENTS

| | | |
|---|---|---|
| EP | 0 387 728 | 9/1990 |
| EP | 1 416 255 | 5/2004 |
| JP | H06160136 | 6/1994 |
| JP | 5155490 | 3/2013 |
| WO | WO 00/03207 | 1/2000 |
| WO | WO 2010/069869 | 6/2010 |
| WO | WO 2012/153090 | 11/2012 |

\* cited by examiner

FLUID SENSOR WITH A FLUID CONDUIT REGION OF COMPOSITE MATERIAL INCLUDING POLYMER MATRIX MATERIAL AND REINFORCING ELEMENTS

FIELD OF INVENTION

The present invention relates to a fluid sensor for sensing a property of a fluid and, in particular, though not exclusively, to a sensor for sensing a property of a fluid produced from or injected into an oil or gas well. The present invention also relates to a method of sensing a fluid and to a method of manufacturing a fluid sensor.

BACKGROUND TO INVENTION

It is known to use acoustic fluid sensors particularly ultrasonic fluid sensors in the oil and gas industry for measuring multi-phase fluid flows. Since such fluid flows may occur at raised pressures, steel pipework has historically been used to provide the structural strength required to provide pressure integrity for such fluid flows.

Acoustic fluid sensors are known in which acoustic transducers are located externally of a steel pipe. The transmission of acoustic energy through the steel pipe into a fluid flow path defined by the steel pipe may be low and such acoustic fluid sensors may not be capable of providing measurements of sufficient accuracy and/or sensitivity for some applications.

Other known acoustic fluid sensors include a steel pipe having one or more apertures formed through the wall thereof. Each aperture is fitted with a window such as a quartz window for the transmission of acoustic waves into and out of a fluid present within the pipe. However, such a window may weaken the pipe and may be difficult to seal for pressure integrity. Moreover, where such a window is located within a recess defined within a wall of the steel pipe, the window may be susceptible to the accumulation of deposits or contamination which may have a detrimental effect on the transmission of acoustic waves through the window and which may degrade sensor performance.

SUMMARY OF INVENTION

It should be understood that any of the features described below in relation to any one or more of the following aspects of the present invention may apply alone or in any combination in relation to any one or more of the other aspects of the present invention.

According to a first aspect of the present invention there is provided a fluid sensor comprising:

a fluid conduit having a wall defining a fluid flow path; and an acoustic transducer located externally of the fluid flow path, wherein the wall of the fluid conduit comprises a composite region between the acoustic transducer and the fluid flow path, the composite region comprising a composite material including a polymer matrix material and one or more reinforcing elements embedded within the polymer matrix material.

Such a fluid sensor may allow enhanced coupling of an acoustic wave between the acoustic transducer and a fluid present in the fluid flow path compared with prior art fluid sensors. This may allow more sensitive acoustic measurements to be performed on the fluid present in the flow path and/or allow acoustic measurements of a given measurement sensitivity to be performed with less acoustic energy. Such a fluid sensor may have improved pressure integrity compared with prior art fluid sensors. Such a fluid sensor may be less prone to the accumulation of deposits and may be less prone to contamination on a surface of the fluid conduit adjacent to the fluid flow path compared with prior art fluid sensors and may, therefore, provide improved measurement accuracy and/or performance compared with prior art fluid sensors. The presence of the composite region between the acoustic transducer and the fluid flow path may provide greater structural strength to the fluid conduit without unduly degrading the transmission of acoustic energy between the fluid flow path and the acoustic transducer.

The fluid conduit may comprise a pipe.

The wall of the fluid conduit may comprise a homogeneous region between the composite region and the fluid flow path, wherein the homogeneous region comprises the polymer matrix material and is substantially devoid of reinforcing elements.

The composite region may be thinner than the homogeneous region. The thickness of the composite region may be selected to provide a desired structural strength to the fluid conduit without unduly degrading the transmission of acoustic energy between the fluid flow path and the acoustic transducer.

The fluid conduit may comprise a homogeneous base member.

The base member may be formed from the polymer matrix.

The base member may define the homogeneous region.

The fluid conduit may comprise an inner layer of composite material located externally of the base member.

The inner layer of composite material may define the composite region.

The transducer may be configured to receive or detect at least one of an acoustic wave or an acoustic signal transmitted in, by or through a fluid present the fluid flow path.

The transducer may be configured to receive or detect at least one of an acoustic wave or an acoustic signal transmitted by a further transducer.

The transducer may be configured to receive or detect a pressure of a fluid present the fluid flow path.

The transducer may be configured to receive or detect a variation in a pressure of a fluid present the fluid flow path.

The transducer may be configured to receive or detect a strain, or a variation in strain, within a wall of the fluid conduit.

The acoustic transducer may be configured to transmit an acoustic wave to the fluid flow path and/or receive an acoustic wave from the fluid flow path along a radial direction relative to a longitudinal axis of the fluid conduit.

The acoustic transducer may be configured to transmit an acoustic wave to the fluid flow path and/or receive an acoustic wave from the fluid flow path along a direction other than a radial direction relative to a longitudinal axis of the fluid conduit.

The acoustic transducer may be configured to transmit an acoustic wave to the fluid flow path and/or receive an acoustic wave from the fluid flow path along a path which defines a chord relative to a longitudinal axis of the fluid conduit.

The acoustic transducer may be configured to transmit an acoustic wave to the fluid flow path and/or receive an acoustic wave from the fluid flow path along a direction having a component parallel to a longitudinal axis of the fluid conduit.

The acoustic transducer may be located externally of the fluid conduit.

The acoustic transducer may be located externally of the base member.

The acoustic transducer may be mounted on or supported by the fluid conduit.

The acoustic transducer may be mounted on or supported by the base member.

The acoustic transducer may be mounted on or supported by an outer surface of the fluid conduit.

The acoustic transducer may be mounted on or supported by an outer surface of the base member.

The acoustic transducer may engage an outer surface of the fluid conduit.

The acoustic transducer may engage an outer surface of the base member.

The acoustic transducer may be partially or fully embedded in the fluid conduit.

The acoustic transducer may be partially embedded in the base member.

The fluid conduit may define a recess. Such a recess may serve to accurately locate the acoustic transducer relative to the fluid flow path and/or relative to one or more further acoustic transducers.

The acoustic transducer may be located partially or fully within the recess.

The recess may define a base surface.

The acoustic transducer may be mounted on or supported by the base surface of the recess.

The acoustic transducer may engage the base surface of the recess.

The composite region may be defined between the fluid flow path and the base surface of the recess.

The composite region may be defined between the homogeneous region and the base surface of the recess. The composite region may provide greater structural strength to the fluid conduit in the vicinity of the recess without unduly degrading the transmission of acoustic energy between the fluid flow path and the acoustic transducer.

The base surface of the recess may be angled. Such a recess having an angled base surface may serve not only to accurately locate the acoustic transducer relative to the fluid flow path and/or relative to one or more further acoustic transducers, but may also serve to accurately orient the acoustic transducer relative to the fluid flow path and/or relative to one or more further acoustic transducers. This may serve to ensure that acoustic waves follow a desired path across the fluid flow path and/or between acoustic transducers.

The fluid sensor may comprise an impedance matching material located between the fluid conduit and the acoustic transducer.

The impedance matching material may comprise a resin or a gel.

The fluid sensor may comprise an outer layer of composite material located externally of the transducer, the composite material comprising a polymer matrix material and one or more reinforcing elements embedded within the polymer matrix material. The outer layer of composite material may provide the fluid sensor with additional structural strength for use with high pressure fluid flows and/or for use in high-pressure environments.

The outer layer of composite material may be deposited on or formed over the transducer.

The outer layer of composite material may be located externally of the base member.

The outer layer of composite material may be located externally of the inner layer of composite material.

The outer layer of composite material may be deposited on or formed over the inner layer of composite material. The composite material of the outer layer of composite material may comprise the same composite material as the composite region.

The composite material of the outer layer of composite material and the composite material of the composite region may comprise different materials.

The acoustic transducer may be partially or fully embedded in the outer layer of composite material.

The acoustic transducer may be configured to operate at one or more ultrasonic frequencies.

The acoustic transducer may be configured to operate at one or more frequencies in a range of 0 MHz-100 MHz, in a range of 1 MHz-10 MHz or in a range centred on a frequency substantially equal to 5 MHz.

The acoustic transducer may comprise a piezo-electric material.

The acoustic transducer may comprise a ceramic material

The acoustic transducer may comprise lead zirconium titanate (PZT).

The acoustic transducer may comprise a layer of piezo-electric material

The layer of piezo-electric material may have a thickness comparable to half a wavelength at an acoustic operating frequency of the acoustic transducer.

The acoustic transducer may comprise a front layer on a front face of the layer of piezo-electric material between the piezo-electric material and the fluid conduit.

The front layer may have a thickness comparable to a quarter of a wavelength at an acoustic operating frequency of the acoustic transducer.

The front layer may have an acoustic impedance which is intermediate an acoustic impedance of the piezo-electric material and an acoustic impedance of the polymer matrix material. Such a front layer may enhance coupling of an acoustic wave between the piezo-electric material and the fluid conduit.

A thickness of the wall of the fluid conduit between the fluid flow path and the acoustic transducer may be comparable to a quarter of a wavelength at an acoustic operating frequency of the acoustic transducer. Such a fluid conduit may serve to enhance coupling of an acoustic wave between the piezo-electric material and the fluid flow path.

The polymer matrix material may have an acoustic impedance which is intermediate an acoustic impedance of the piezo-electric material and an acoustic impedance of oil or water.

The acoustic transducer may comprise a backing layer on a rear side of the layer of piezo-electric material.

The backing layer may be configured to at least partially suppress reflection of an acoustic wave at an acoustic operating frequency of the acoustic transducer. The backing layer may be configured to at least partially absorb an acoustic wave at an acoustic operating frequency of the acoustic transducer.

The fluid sensor may comprise a filler member.

The filler member may comprise a stiff, rigid and/or non-compliant material.

The filler member may comprise the same polymer material as the polymer matrix material.

The filler member may be located between the transducer and the fluid conduit.

The filler member may be located between a rear face of the transducer and the fluid conduit.

The filler member may be located between a side of the transducer and the fluid conduit.

The filler member may be located between the transducer and the base member.

The fluid sensor may comprise a compliant filler material provided between the transducer and the fluid conduit.

The compliant filler material may comprise a potting compound, a resin or a gel.

The compliant filler material may comprise the same material as the impedance matching material.

The fluid sensor may comprise an electrical signal generator and an electrical signal receiver.

The electrical signal generator and the electrical signal receiver may be configured to operate at one or more ultrasonic frequencies.

The electrical signal generator and the electrical signal receiver may be configured to operate at one or more frequencies in a range of 0 MHz-100 MHz, in a range of 1 MHz-10 MHz or in a range centred on a frequency substantially equal to 5 MHz.

The electrical signal generator may be coupled to the acoustic transducer at a first time and the electrical signal receiver may be coupled to the acoustic transducer at a second time different to the first time.

The fluid sensor may comprise a plurality of acoustic transducers.

Each acoustic transducer may be located externally of the fluid flow path.

The plurality of acoustic transducers may be circumferentially distributed relative to a longitudinal axis of the fluid conduit.

The plurality of acoustic transducers may be axially distributed relative to a longitudinal axis of the fluid conduit.

The plurality of acoustic transducers may comprise a transmitting transducer and a receiving transducer.

The transmitting transducer may be configured to transmit an acoustic wave to the receiving transducer via the fluid flow path. The transmitting transducer and the receiving transducer may be angled towards one another.

The transmitting transducer may be configured to transmit an acoustic wave to the receiving transducer via the fluid flow path along a radial direction relative to a longitudinal axis of the fluid conduit. The transmitting transducer and the receiving transducer may be diametrically opposed relative to a longitudinal axis of the fluid conduit.

The transmitting transducer may be configured to transmit an acoustic wave to the receiving transducer via the fluid flow path along a direction other than a radial direction relative to a longitudinal axis of the fluid conduit.

The transmitting transducer may be configured to transmit an acoustic wave to the receiving transducer via the fluid flow path along a path which defines a chord relative to a longitudinal axis of the fluid conduit. The transmitting transducer and the receiving transducer may be located at opposite ends of a chord defined relative to a longitudinal axis of the fluid conduit.

The transmitting transducer may be configured to transmit an acoustic wave to the receiving transducer via the fluid flow path along a direction having a component parallel to a longitudinal axis of the fluid conduit.

The electrical signal generator may be coupled to the transmitting transducer and the electrical signal receiver may be coupled to the receiving transducer.

The plurality of acoustic transducers may comprise a transmitting transducer and a plurality of receiving transducers. Each receiving transducer may be arranged at a different position around the fluid flow path. Such an arrangement of receiving transducers may allow acoustic waves to be received from the fluid flow path along a plurality of different directions. This may allow back-scatter to be measured from any fluid present in the fluid flow path. This may permit a gas bubble size and density to be determined from the received acoustic waves or may permit a fluid composition and/or distribution to be determined from the received acoustic waves.

The plurality of receiving transducers may be arranged in an array. Such an array of receiving transducers may be used as a phased array to allow the detection of acoustic waves along one or more preferred discrete directions from the fluid flow path.

The plurality of acoustic transducers may comprise a plurality of transmitting transducers and a receiving transducer. The plurality of transmitting transducers may be arranged in an array. Such an array of transmitting transducers may be used as a phased array to allow the transmission of acoustic waves along one or more preferred directions towards the fluid flow path.

The fluid sensor may comprise a plurality of transducer pairs, wherein each transducer pair comprises a transmitting transducer and a receiving transducer and, wherein the transmitting transducer of each transducer pair is configured to transmit an acoustic wave to the corresponding receiving transducer via the fluid flow path along a different direction.

The transmitting transducer of each transducer pair may be configured to transmit an acoustic wave to the corresponding receiving transducer via the fluid flow path along a different radial direction relative to a longitudinal axis of the fluid conduit.

The transmitting transducer of each transducer pair may be configured to transmit an acoustic wave to the corresponding receiving transducer via the fluid flow path along a direction defined by a different chord relative to a longitudinal axis of the fluid conduit.

The fluid sensor may comprise a source for transmitting electromagnetic radiation into the fluid flow path and a sensor for receiving electromagnetic radiation from the fluid flow path. The electromagnetic radiation may have a frequency in the range, 1 kHz to 1 THz, 10 kHz to 100 GHz, 100 kHz to 10 GHz, or 1 MHz to 1 GHz. The electromagnetic radiation may comprise at least one of radio frequency (RF) radiation, microwave radiation, and/or mm-wave radiation. Such a fluid sensor may allow electromagnetic measurements to be performed on any fluid present in the fluid flow path to provide additional information about the fluid.

The fluid sensor may comprise an electrical oscillator, a gain medium or an amplifier for an electrical signal. When used in combination with a cavity member which is configured to confine electromagnetic energy, an electrical oscillator, a gain medium or an amplifier may define an electromagnetic resonator having a resonant frequency which depends on the contents of an electromagnetic field defined by the cavity member including any fluid present in the fluid flow path. The electrical signal may have a frequency in the range, 1 kHz to 1 THz, 10 kHz to 100 GHz, 100 kHz to 10 GHz, or 1 MHz to 1 GHz. The electrical signal may comprise a radio frequency (RF) electrical signal, a microwave frequency electrical signal, and/or a mm-wave frequency electrical signal.

The material of the fluid conduit may be configured to have an acoustic impedance intermediate the acoustic impedance of steel and the acoustic impedance of oil or water.

The material of the base member may be configured to have an acoustic impedance intermediate the acoustic impedance of steel and the acoustic impedance of oil or water.

The polymer matrix material may have an acoustic impedance between 1 MPa·s·m$^{-1}$ and 46 MPa·s·m$^{-1}$, between 1.5 MPa·s·m$^{-1}$ and 3.5 MPa·s·m$^{-1}$, or between 2.4 MPa·s·m$^{-1}$ and 2.6 MPa·s·m$^{-1}$.

The composite material of the fluid conduit may have an acoustic impedance between 1 MPa·s·m$^{-1}$ and 46 MPa·s·m$^{-1}$, between 1.5 MPa·s·m$^{-1}$ and 3.5 MPa·s·m$^{-1}$, or between 2.4 MPa·s·m$^{-1}$ and 2.6 MPa·s·m$^{-1}$.

The material of the fluid conduit may be configured to have an acoustic impedance which is selected to substantially match that of oil or water.

The material of the base member may be configured to have an acoustic impedance which is selected to substantially match that of oil or water.

The polymer matrix material may comprise at least one of a thermoplastic material and a thermoset material.

The polymer matrix material may comprise at least one of a polyaryl ether ketone, a polyaryl ketone, a polyether ketone (PEK), a polyether ether ketone (PEEK), a polycarbonate, polyvinyl chloride (PVC), a polyamide, polyamide 11 (PA11), polyvinylidene fluoride, polyvinylidene difluoride (PVDF), polyphenylene sulphide (PPS), polyethylenimines (PEI), polyoxymethylene (POM), acetal, a setting resin, a polymeric resin, and an epoxy resin.

The one or more reinforcing elements may be configured to absorb electromagnetic radiation. The one or more reinforcing elements may be configured to absorb electromagnetic radiation having a frequency in the range, 1 kHz to 1 THz, 10 kHz to 100 GHz, 100 kHz to 10 GHz, or 1 MHz to 1 GHz. The use of such reinforcing elements may allow the outer layer of composite material to act as a composite cavity member for at least partially confining an electromagnetic field having a frequency in any such frequency ranges. Such a composite cavity member may define a cavity for the electromagnetic field which cavity extends at least partially into the fluid flow path. Such a cavity may allow electromagnetic measurements to be performed on a fluid present in the fluid flow path in addition to acoustic measurements performed using the transducer. Such electromagnetic measurements may provide additional information about, or may permit the measurement of additional properties of, any fluid present in the fluid flow path. The one or more reinforcing elements may be configured to absorb electromagnetic radiation at a radio frequency (RF), a microwave frequency, and/or a mm-wave frequency. The one or more reinforcing elements may be electrically conductive.

The one or more reinforcing elements may be substantially transparent to electromagnetic radiation. The one or more reinforcing elements may be substantially transparent to electromagnetic radiation having a frequency in the range, 1 kHz to 1 THz, 10 kHz to 100 GHz, 100 kHz to 10 GHz, or 1 MHz to 1 GHz. The use of such reinforcing elements may allow the composite material to provide additional structural support for the base member without providing any confinement for an electromagnetic field having a frequency in any such frequency ranges. The one or more reinforcing elements may be substantially transparent to electromagnetic radiation at a radio frequency (RF), a microwave frequency, and/or a mm-wave frequency. The one or more reinforcing elements may be substantially electrically non-conductive.

The one or more reinforcing elements may comprise carbon fibres.

The one or more reinforcing elements may comprise metallic fibres.

The one or more reinforcing elements may comprise polymeric fibres, for example aramid fibres. The one or more reinforcing elements may comprise non-polymeric fibres, for example, glass, basalt fibres and/or the like. The one or more reinforcing elements may comprise E-glass.

At least one of the one or more reinforcing elements may be aligned at a predetermined angle relative to a longitudinal axis of the fluid conduit.

At least one of the one or more reinforcing elements may be aligned at a positive angle relative to a longitudinal axis of the base member and at least one of the one or more reinforcing elements is aligned at a negative angle relative to a longitudinal axis of the fluid conduit.

At least one of the one or more reinforcing elements may be aligned parallel to, or circumferentially relative to, a longitudinal axis of the fluid conduit.

According to a second aspect of the present invention there is provided a method of sensing a property of a fluid, comprising:

receiving an acoustic wave through a composite region of a wall of a fluid conduit from a fluid flow path defined by the wall, wherein the composite region comprises a composite material including a polymer matrix material and one or more reinforcing elements embedded within the polymer matrix material.

The method may comprise transmitting the acoustic wave through the composite region of the wall of the fluid conduit to the fluid flow path.

The method may comprise locating a fluid in the fluid flow path.

The method may comprise passing or flowing a fluid along the fluid flow path.

The method may comprise determining an amplitude or energy of a transmitted acoustic wave.

The method may comprise determining an amplitude or energy of a received acoustic wave.

The method may comprise determining transmission and/or absorption of the acoustic wave through the fluid flow path from the determined amplitudes or energies of the transmitted and received acoustic waves.

The method may comprise measuring a time of flight of the acoustic wave.

The method may comprise determining a speed of the acoustic wave.

The method may comprise determining a property of a fluid in the fluid flow path from the speed of the acoustic wave.

The method may comprise measuring a phase delay between the received acoustic wave and the transmitted acoustic wave. The method may comprise using a phase comparator and/or a phase-locked loop for this purpose.

The method may comprise receiving a plurality of acoustic waves from the fluid flow path. Each received acoustic wave may travel along a different direction to the other acoustic waves.

The method may comprise determining a gas bubble size and density from the received plurality of acoustic waves.

The method may comprise determining a fluid composition and/or distribution from the received plurality of acoustic waves.

The method may comprise transmitting an acoustic wave along a radial direction relative to a longitudinal axis of the fluid conduit.

The method may comprise receiving an acoustic wave along a radial direction relative to a longitudinal axis of the fluid conduit.

The method may comprise receiving a plurality of acoustic waves, each acoustic wave being received along a different radial direction to the other acoustic waves relative to a longitudinal axis of the fluid conduit.

The method may comprise transmitting an acoustic wave along a direction having a component parallel to a longitudinal axis of the fluid conduit.

The method may comprise receiving an acoustic wave along a direction having a component parallel to a longitudinal axis of the fluid conduit.

The method may comprise transmitting an acoustic wave along a direction defining a chord relative to a longitudinal axis of the fluid conduit.

The method may comprise receiving an acoustic wave along a direction defining a chord relative to a longitudinal axis of the fluid conduit.

The time of flight of an acoustic wave measured using such a method may depend on a flow rate of a fluid in the fluid flow path. This may allow the flow rate of a fluid in the fluid flow path to be determined from the time of flight.

The method may comprise receiving each acoustic wave from the fluid flow path at the same time. Such a method may allow a distribution of a fluid in the fluid flow path to be determined. Such a method may allow the detection of an acoustic wave from the fluid flow path in a preferential direction using a phase array technique.

The method may comprise receiving each acoustic wave from the fluid flow path at a different time to the other acoustic waves. Such a method may allow changes in a property of a fluid in the fluid flow path such as a composition and/or flow rate of the fluid in the fluid flow path to be monitored over time.

The method may comprise transmitting a plurality of acoustic waves to the fluid flow path.

The method may comprise transmitting each acoustic wave to the fluid flow path along a different direction to the other acoustic waves.

The method may comprise transmitting each acoustic wave to the fluid flow path at the same time. Such a method may allow the transmission of an acoustic wave to the fluid flow path in a preferential direction using a phase array technique.

The method may comprise transmitting each acoustic wave to the fluid flow path at a different time to the other acoustic waves. Such a method may allow changes in a property of a fluid in the fluid flow path such as a composition and/or flow rate of the fluid in the fluid flow path to be monitored over time.

According to a third aspect of the present invention there is provided a method of manufacturing a fluid sensor comprising:

providing a fluid conduit having a wall defining a fluid flow path; and providing an acoustic transducer externally of the fluid flow path, wherein the wall of the fluid conduit comprises a composite region between the acoustic transducer and the fluid flow path, and the composite region comprises a composite material including a polymer matrix material and one or more reinforcing elements embedded within the polymer matrix material.

The method may comprise forming a recess in the fluid conduit.

The method may comprise locating the transducer in the recess.

The method may comprise providing a base member.

The base member may be homogeneous.

The base member may comprise the polymer matrix material.

The method may comprise providing an inner layer of composite material externally to the base member, the composite material comprising a polymer matrix material and one or more reinforcing elements embedded within the polymer matrix material.

The method may comprise forming the recess in the inner layer of composite material.

The method may comprise forming the recess in the base member.

The method may comprise providing an outer layer of composite material externally to the transducer, the composite material comprising a polymer matrix material and one or more reinforcing elements embedded within the polymer matrix material.

The method may comprise providing the outer layer of composite material on or over the transducer.

The method may comprise forming the outer layer of composite material on or over the transducer.

The composite material of the outer layer of composite material may comprise the same composite material as the composite region.

The method may comprise providing the outer layer of composite material externally to the base member.

The method may comprise providing the outer layer of composite material externally to the inner layer of composite material.

The method may comprise providing the outer layer of composite material on or over the inner layer of composite material.

The method may comprise forming the outer layer of composite material on or over the inner layer of composite material. The method may comprise locating a filler member externally of the transducer.

The filler member may comprise the polymer matrix material.

The method may comprise aligning a rear face of the filler member flush with an outer surface of the inner layer of composite material.

The method may comprise forming the outer layer of composite material on or over the filler member.

The method may comprise applying a compliant filler material to the transducer.

The method may comprise applying a compliant filler material to the filler member.

The method may comprise applying a compliant filler material to one or both of the inner and outer layers of composite material.

According to a fourth aspect of the present invention there is provided a fluid sensor comprising:

a base member defining a fluid flow path; and an acoustic transducer located externally of the fluid flow path for transmitting an acoustic wave through at least part of a wall of the base member to the fluid flow path and/or for receiving an acoustic wave from the fluid flow path through at least part of the wall of the base member, wherein the base member comprises a polymer material.

The base member may comprise a homogeneous material.

The base member may comprise a composite material including the polymer material and one or more reinforcing elements embedded within the polymer material.

The wall of the base member may comprise a homogeneous region between the fluid flow path and the acoustic transducer, wherein the homogeneous region comprises the polymer matrix material and is substantially devoid of reinforcing elements.

The wall of the base member may comprise a composite region between the fluid flow path and the acoustic transducer, the composite region comprising a composite material including the polymer material and one or more reinforcing elements embedded within the polymer material.

The composite region may be located between the homogeneous region and the acoustic transducer.

The composite region may be thinner than the homogeneous region. The thickness of the composite region may be selected to provide a desired structural strength to the base member without unduly degrading the transmission of acoustic energy through the wall of the base member between the fluid flow path and the acoustic transducer.

According to a fifth aspect of the present invention there is provided a method of sensing a property of a fluid, comprising:

transmitting an acoustic wave through at least part of a wall of a base member comprising a polymer material to a fluid flow path defined by the base member; and receiving an acoustic wave from the fluid flow path through at least part of the wall of the base member.

According to a sixth aspect of the present invention there is provided a method of manufacturing a fluid sensor comprising:

providing a base member defining a fluid flow path, the base member comprising a polymer; and providing an acoustic transducer externally of the fluid flow path.

BRIEF DESCRIPTION OF THE DRAWINGS

The present invention will now be described by way of non-limiting example only with reference to the following drawings of which.

DETAILED DESCRIPTION OF THE DRAWINGS

Referring initially to FIGS. 1(a) and 1(b) there is provided a fluid sensor generally designated 2 which includes a fluid conduit in the form of a pipe 4, a transmitting acoustic transducer in the form of a transmitting ultrasonic transducer 6 and a receiving acoustic transducer in the form of a receiving ultrasonic transducer 8. The pipe 4 has a wall 9 which defines a fluid flow path 10. The pipe 4 comprises an inner sleeve 12 formed from a homogeneous polyether ether ketone (PEEK) material and an inner composite layer 14a formed around the PEEK sleeve 12. The inner composite layer 14a comprises a composite material formed from a PEEK matrix material and one or more carbon fibres embedded within the PEEK matrix material. The PEEK matrix material of the inner composite layer 14a is continuous with the PEEK material of the PEEK sleeve 12.

The acoustic transducers 6, 8 are mounted on the pipe 4 diametrically opposite one another. The fluid sensor 2 includes an outer layer 14b of composite material which is formed over the inner layer 14a of composite material and the acoustic transducers 6, 8. The outer layer 14b of composite material comprises a PEEK matrix material and one or more carbon fibre reinforcing elements embedded within the PEEK matrix material. The PEEK matrix material of the outer layer 14b of composite material is continuous with the PEEK matrix material of the inner composite layer 14a and the PEEK material of the PEEK sleeve 12.

A cable 16 extends through the outer layer 14b of composite material to the transmitting transducer 6 for the transmission of an electrical signal from an electrical signal generator (not shown) to the transmitting transducer 6. Similarly, a cable 18 extends through the outer layer 14b of composite material to the receiving transducer 8 for the transmission of an electrical signal from the receiving transducer 8 to an electrical signal receiver (not shown).

Figure 1:
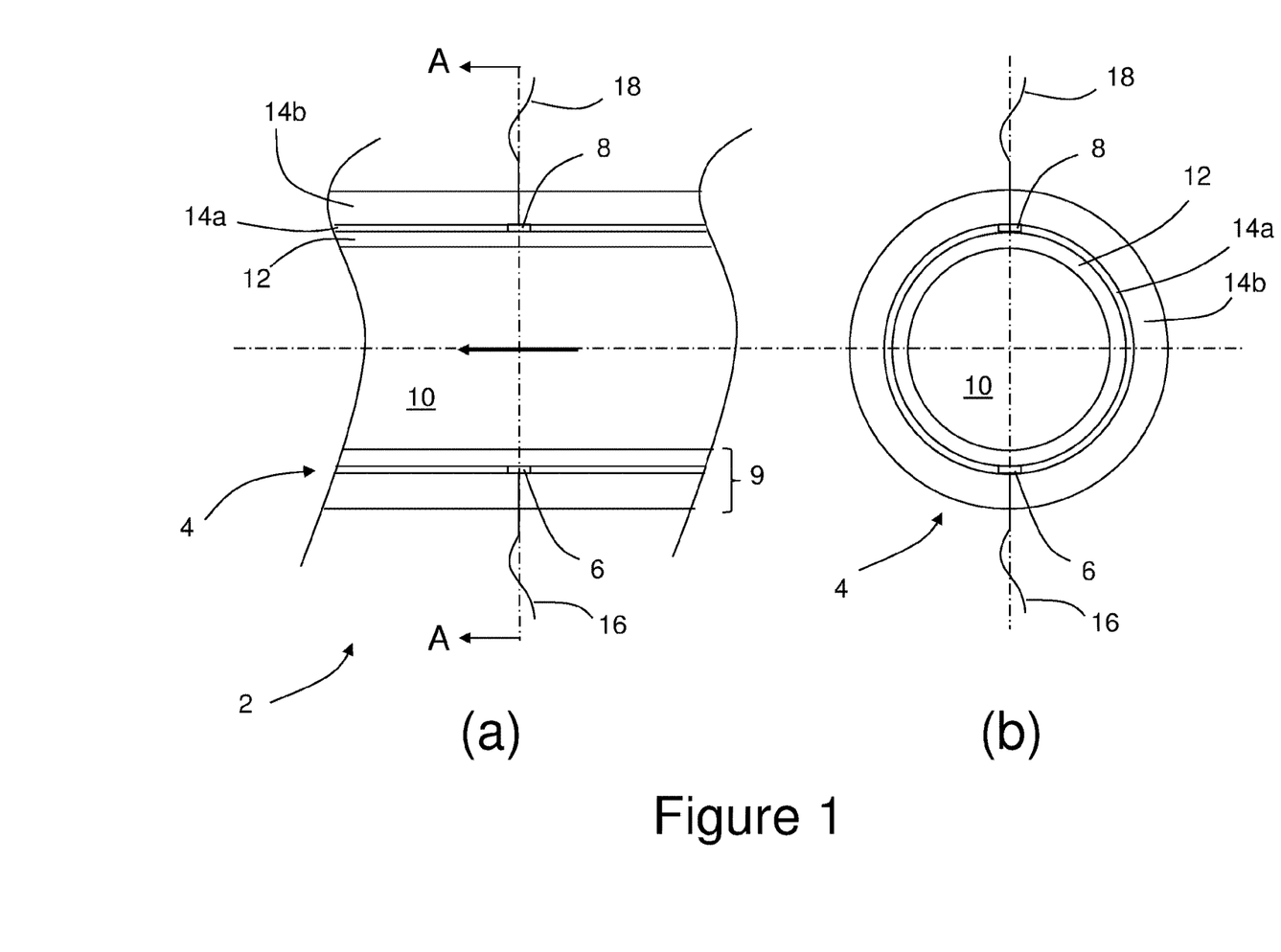
FIG. 1(a) is a schematic longitudinal cross-section of a fluid sensor.
FIG. 1(b) is a schematic cross-section on AA of the fluid sensor of FIG. 1(a)
Figure 2:
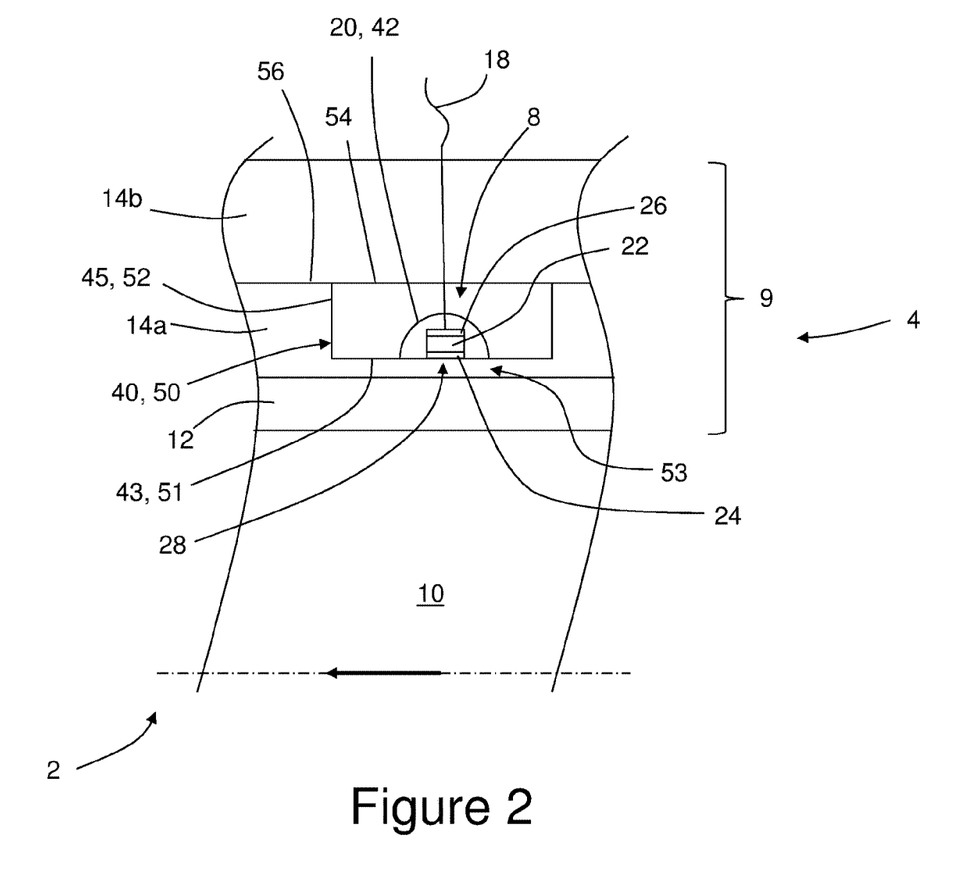
FIG. 2 is a detail of the schematic longitudinal cross-section of the fluid sensor of FIGS. 1(a) and 1(b) in the vicinity of an acoustic transducer.

FIG. 2 shows the fluid sensor 2 of FIGS. 1(a) and 1(b) in more detail in the vicinity of the receiving transducer 8. The receiving transducer 8 includes a hemispherical housing 20 which encloses a layer 22 of lead zirconium titanate (PZT) piezoelectric material sandwiched between a quarter wavelength thick front layer 24 and an absorbing backing layer 26. The acoustic impedance of the front layer 24 is selected for the constructive interference of multiple reflections within the front layer 24. The backing layer 26 at least partially suppresses reflection of acoustic energy. The presence of the front layer 24 and/or the backing layer 26 may result in more efficient coupling of acoustic energy between the fluid flow path 10 and the PZT layer 22 through the wall 9 of the pipe 4. The housing 20 defines a window 28 in a front side thereof. An impedance matching resin material (not shown) may be provided between the material of the wall 9 of the pipe 4 and the window 28 of the housing 20. Use of such an impedance matching resin material may result in more efficient coupling of acoustic energy between the transducer 8 and the material of the wall 9 of the pipe 4.

The fluid sensor 2 further includes a PEEK filler member 40 which defines a recess 42 in a front face 43 thereof for accommodating the receiving transducer 8. A potting compound or compliant filler material (not shown) may be provided between each side 45 of the PEEK filler member 40 and the composite material of the inner composite layer 14a. The use of such compliant filler material may avoid the formation of any air-filled voids around the PEEK filler member 40, which voids might otherwise compromise the pressure integrity of the fluid sensor 2 when high pressure fluids are present in the fluid flow path 10 and/or when the fluid sensor 2 is located in a high pressure environment. The compliant filler material may comprise the same material as the impedance matching resin material.

Although not shown explicitly in FIGS. 1(*a*), 1(*b*) and 2, it should be understood that the cables 16, 18 are sealed relative to the PEEK filler member 40 and the outer layer 14*b* of composite material. The fluid sensor 2 may, for example, include compliant filler material (not shown) around the cables 16, 18 for this purpose. It should be understood that the detail of the fluid sensor 2 of FIGS. 1(*a*) and 1(*b*) in the vicinity of the transmitting transducer 6 is identical to that described above for the receiving transducer 8.

The manufacture of the fluid sensor 2 is accomplished in different stages. In the first stage, the composite material of the inner composite layer 14*a* of the pipe 4 is deposited or formed on the inner sleeve 12. In a second stage, a recess 50 having a bottom surface 51 and sides 52 is formed, for example, machined in the inner composite layer 14*a*. The depth of the recess 50 is chosen so as to define a composite region 53 in the form of a residual thickness of composite material between an outer surface of the PEEK sleeve 11 and the bottom 51 of the recess 50. This may provide greater structural strength to the pipe 4 in the vicinity of the recess 50 without unduly degrading the transmission of acoustic energy between the fluid flow path 10 and the receiving transducer 8.

The impedance matching resin material is applied to the bottom 51 of the recess 50 and/or to the window 28. The compliant filler material is applied to the sides of the PEEK filler member 40 and/or to the sides 52 of the recess 50. The receiving transducer 8 and the PEEK filler member 40 are inserted into the recess 50 such that a back face 54 of the PEEK filler member 40 is flush with an outer surface 56 of the inner composite layer 14*a*. The outer layer 14*b* of composite material is then deposited or formed on or over the inner composite layer 14*a* and the back side 54 of the PEEK filler member 40 until the outer layer of composite material 14*b* is complete.

In use, a fluid is located, for example, flowed through the fluid flow path 10. The transmitting ultrasonic transducer 6 transmits an acoustic wave through the fluid in the fluid flow path 10 to the receiving ultrasonic transducer 8 through the PEEK sleeve 12 and the composite region 53 adjacent to each transducer 6, 8. A property of the fluid in the fluid flow path 10 is determined using one or more known techniques from knowledge of the electrical signal applied to the transmitting transducer 6 via the cable 16 and measurement and analysis of an electrical signal received from the receiving transducer 8 via the cable 18. For example, a speed of sound of the acoustic wave through the fluid in the fluid flow path 10 may be determined from a measurement of a time of flight of the acoustic wave from the transmitting transducer 6 to the receiving transducer 8 and the determined speed of sound compared to the speed of sound measured using the fluid sensor 2 during a calibration procedure for various known fluids.

Figure 3:
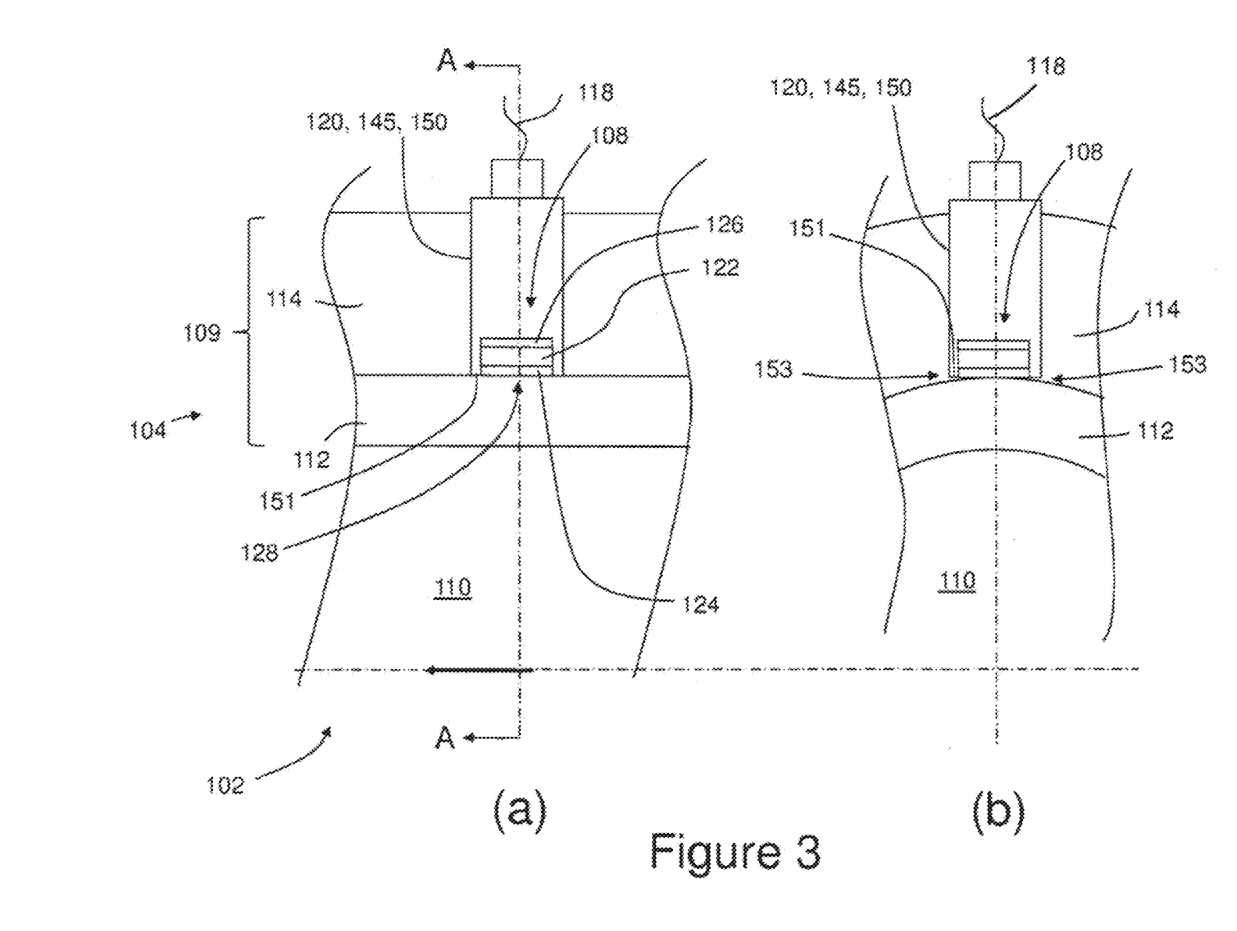
FIG. 3(a) is a detail of a schematic longitudinal cross-section of a first alternative fluid sensor in the vicinity of an acoustic transducer.
FIG. 3(b) is a detail of a schematic cross-section on AA of the fluid sensor of FIG. 3(a)

FIGS. 3(*a*) and 3(*b*) shows a detail of a first alternative fluid sensor 102 in the vicinity of a receiving transducer 108. The first alternative fluid sensor 102 and the fluid sensor 2 share many like features and, as such, the features of the first alternative fluid sensor 102 shown in FIGS. 3(*a*) and 3(*b*) have the same reference numerals as the corresponding features of the fluid sensor 2 of FIGS. 1(*a*), 1(*b*) and 2 incremented by "100". Like the acoustic transducer 8 shown in FIG. 2, the acoustic transducer 108 shown in FIGS. 3(*a*) and 3(*b*) is mounted on a pipe 104 which defines a fluid flow path 110. The pipe 104 comprises a PEEK sleeve 112 and a layer 114 of composite material comprising carbon fibres embedded in a PEEK matrix material formed around the PEEK sleeve 112. A cable 118 extends through the composite layer 114 to the acoustic transducer 108 for the transmission of an electrical signal from the acoustic transducer 108 to an electrical signal detector (not shown).

The transducer 108 further comprises a generally cylindrical housing 120 with a window 128 in a front surface thereof. Like the transducer 8 shown in FIG. 2, the transducer 108 shown in FIGS. 3(*a*) and 3(*b*) includes a layer 122 of PZT sandwiched between a quarter wavelength thick front layer 124 and an absorbing backing layer 126. However, unlike the fluid sensor 2 shown in FIG. 2, the fluid sensor 102 shown in FIGS. 3(*a*) and 3(*b*) has no filler member. It should be understood that the relative thicknesses of the PEEK sleeve 112, the composite layer 114, and the relative thicknesses of the layers 122, 124 and 126 of the transducer 106 may be different to those shown in FIGS. 3(*a*) and 3(*b*).

During the manufacture of the first alternative fluid sensor 102 shown in FIGS. 3(*a*) and 3(*b*), a recess 150 is formed for example, machined in the composite layer 114. The depth of the recess 150 is chosen such that the bottom 151 of the recess just meets the outer surface of the PEEK sleeve 112. As a consequence of the generally cylindrical geometry of the housing 120 of the transducer 108, a generally annular composite region 153 is defined by the residual thickness of composite material between the outer surface of the PEEK sleeve 112 and the bottom 151 of the recess 150. The composite region 153 may provide some structural strength to the wall 109 of the pipe 104 in the vicinity of the recess 150 without unduly degrading the transmission of acoustic energy between the fluid flow path 110 and the receiving transducer 108. An impedance matching resin material may be provided between the bottom 151 of the recess 150 and the window 128 of the housing 120. A compliant filler material (not shown) may be provided between the sides 145 of the housing 120 of the transducer 108 and the composite material of the composite layer 114.

Figure 4:
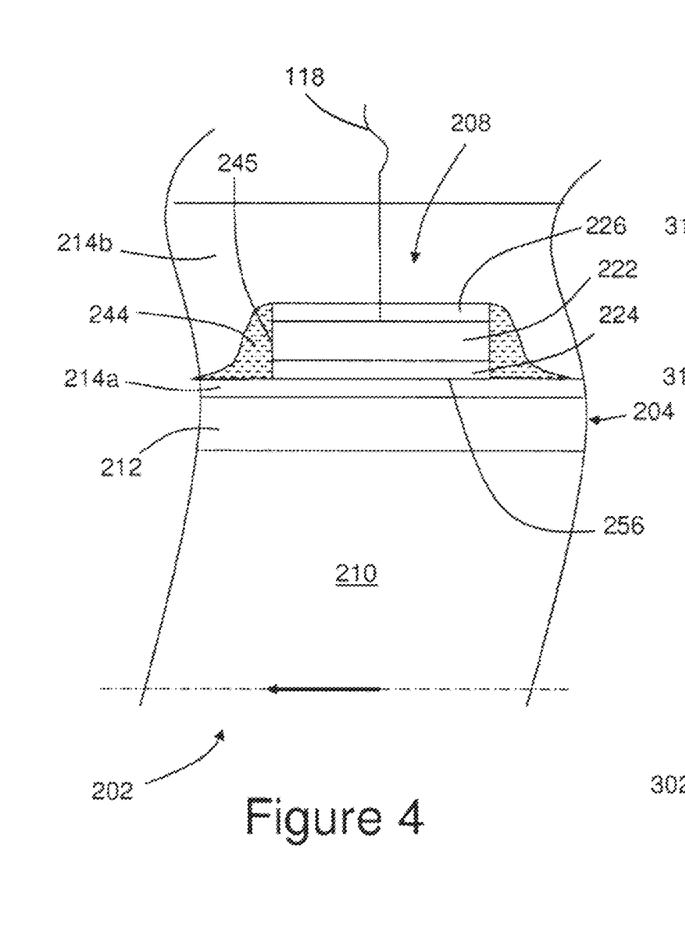
FIG. 4 is a detail of a schematic longitudinal cross-section of a second alternative fluid sensor in the vicinity of an acoustic transducer.

FIG. 4 shows a detail of a second alternative fluid sensor 202 in the vicinity of a receiving transducer 208. The second alternative fluid sensor 202 and the fluid sensor 2 share many like features and, as such, the features of the second alternative fluid sensor 202 shown in FIG. 4 have the same reference numerals as the corresponding features of the fluid sensor 2 of FIGS. 1(*a*), 1(*b*) and 2 incremented by "200". Like the acoustic transducer 8 shown in FIG. 2, the acoustic transducer 208 shown in FIG. 4 is mounted on a pipe 204 which defines a fluid flow path 210. The pipe 204 comprises a PEEK sleeve 212 and an inner layer 214*a* of composite material comprising carbon fibres embedded in a PEEK matrix material formed around the PEEK sleeve 212. An outer layer 214*b* of composite material is deposited on or formed over the inner layer 214*a* of composite material and the acoustic transducer 208.

Like the transducer 8 shown in FIG. 2, the transducer 208 shown in FIG. 4 includes a layer 222 of PZT sandwiched between a quarter wavelength thick front layer 224 and an absorbing backing layer 226. However, unlike the transducer 8 shown in FIG. 2, the transducer 208 shown in FIG. 4 has no housing. Instead, the layers 222, 224 and 226 of the transducer 208 are mounted directly onto the pipe 204 such that the front layer 224 of the transducer 208 either engages an outer surface 256 of the inner composite layer 214*a*, or is separated from the outer surface 256 of the inner composite layer 214*a* by an impedance matching resin material (not shown). Moreover, unlike the transducer 8 shown in FIG. 2, the transducer 208 shown in FIG. 4 has no filler member. A compliant filler material 244 is provided between the sides 245 of the layers 222, 224 and 226 of the transducer 208 and the outer layer 214b of composite material. It should be appreciated that the relative thicknesses of the PEEK sleeve 212 and the inner composite layer 214a, the relative thickness of the outer composite layer 214b, and the relative thicknesses of the layers 222, 224 and 226 of the transducer 208 may be different to those shown in FIG. 4.

Figure 5:
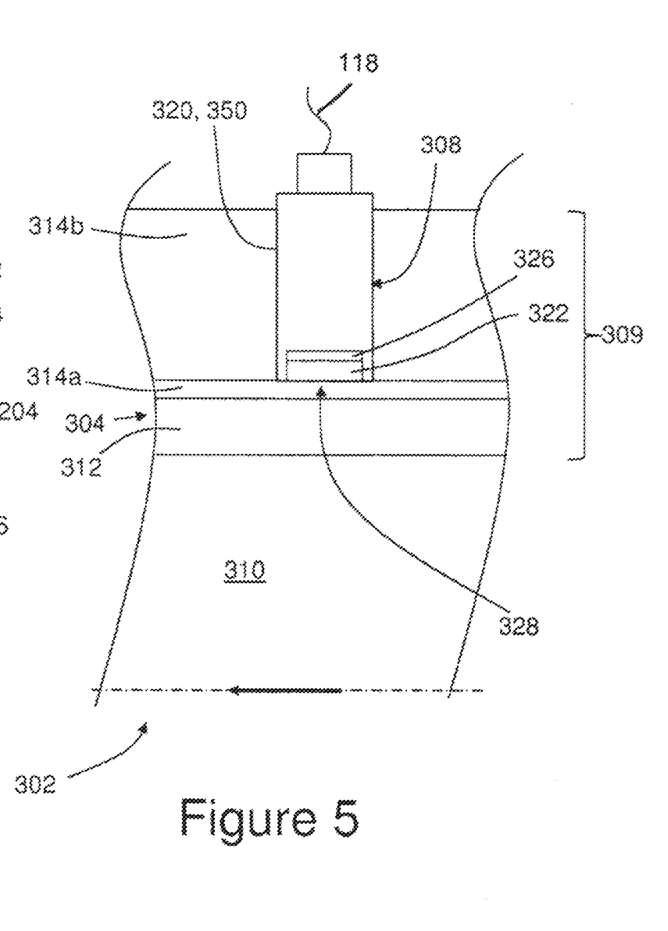
FIG. 5 is a detail of a schematic longitudinal cross-section of a third alternative fluid sensor in the vicinity of an acoustic transducer.

FIG. 5 shows a detail of a third alternative fluid sensor 302 in the vicinity of a receiving transducer 308. The second alternative fluid sensor 302 and the fluid sensor 2 share many like features and, as such, the features of the third alternative fluid sensor shown in FIG. 5 have the same reference numerals as the corresponding features of the fluid sensor 2 of FIGS. 1(*a*), 1(*b*) and 2 incremented by "300". Like the acoustic transducer 8 shown in FIG. 2, the acoustic transducer 308 is mounted on a pipe 304 which defines a fluid flow path 310. The pipe 304 comprises a PEEK sleeve 312 and an inner layer 314a of composite material comprising carbon fibres embedded in a PEEK matrix material formed around the PEEK sleeve 312. An outer layer 314b of composite material comprising carbon fibres embedded in a PEEK matrix is located externally of the inner layer 314a of composite material. A recess 350 is formed in the outer layer 314b of composite material to accommodate the acoustic transducer 308. Like the transducer 8 shown in FIG. 2, the transducer 308 includes a housing 320 which encloses a layer 322 of PZT and an absorbing backing layer 326. However, unlike the transducer 8 shown in FIG. 2, the transducer 308 has no front layer. Instead, a thickness of that part of the wall 309 of the pipe 304 between the transducer 308 and the fluid flow path 310 is selected to be a quarter of a wavelength thick. The housing 320 defines a window 328 in a front side thereof. An impedance matching resin material (not shown) may be provided between the material of the wall 309 of the pipe 304 and the window 328 of the housing 320. A compliant filler material (not shown) may be provided between each side 345 of the housing 320 and the outer layer 314b of composite material.

Figure 6:
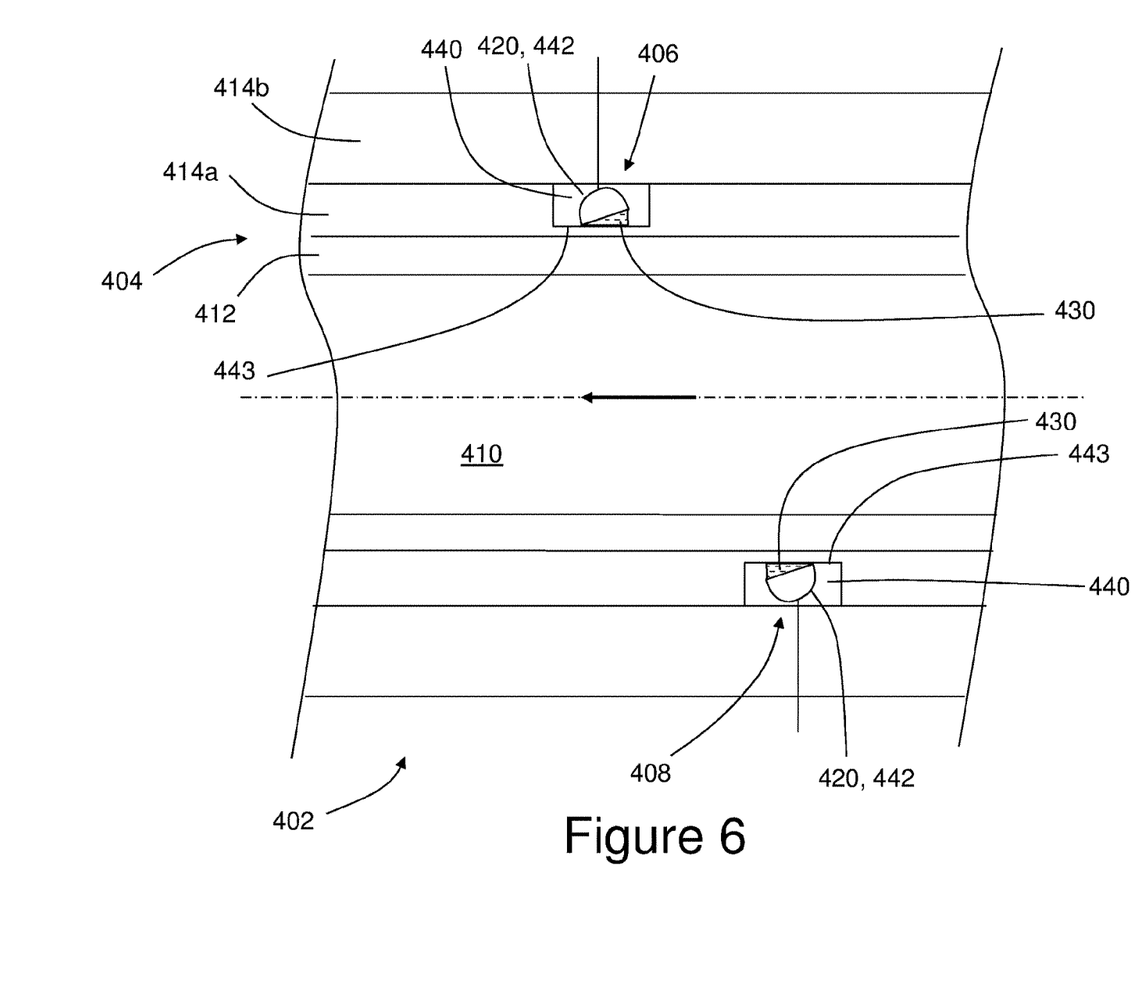
FIG. 6 is a schematic longitudinal cross-section of a fourth alternative fluid sensor.

FIG. 6 shows a detail of a fourth alternative fluid sensor 402 which shares many like features with the fluid sensor 2 described with reference to FIGS. 1(*a*), 1(*b*) and 2. As such, the features of the fourth alternative fluid sensor 402 shown in FIG. 6 have the same reference numerals as the corresponding features of the fluid sensor 2 of FIGS. 1(*a*), 1(*b*) and 2 incremented by "400". Like the fluid sensor 2, the fluid sensor 402 of FIG. 6 includes a pipe 404, a first ultrasonic transducer 406 and a second ultrasonic transducer 408. The pipe 404 defines a fluid flow path 410 internally thereof. The pipe 404 comprises a PEEK sleeve 412 and an inner layer 414a of composite material comprising carbon fibres embedded in a PEEK matrix material formed around the PEEK sleeve 412. During a first period, the first ultrasonic transducer 406 is configured to transmit an acoustic wave and the second ultrasonic transducer 408 is configured to receive an acoustic wave. During a second period, the second ultrasonic transducer 408 is configured to transmit an acoustic wave and the first ultrasonic transducer 406 is configured to receive an acoustic wave.

The acoustic transducers 406, 408 are mounted on the pipe 404. The fluid sensor 402 includes an outer layer 414b of composite material which is located externally of the inner layer 414a of composite material and which comprises a PEEK matrix and one or more carbon fibre reinforcing elements embedded within the PEEK matrix. The outer layer 414b of composite material is located externally of the acoustic transducers 406, 408.

Like the acoustic transducers 6, 8 of FIGS. 1(*a*), 1(*b*) and 2, each acoustic transducer 406, 408 includes a hemispherical housing 420 which encloses a layer of PZT (not shown) sandwiched between a quarter wavelength thick front layer (not shown) and an absorbing backing layer (not shown). Each housing 420 defines a window (not shown) in a front side thereof.

The fluid sensor 402 further includes PEEK filler members 440 which each define a recess 442 in a front face 443 thereof for accommodating the transducers 406, 408. Unlike the acoustic transducers 6, 8 of FIGS. 1(*a*), 1(*b*) and 2, however, the acoustic transducers 406, 408 are axially offset from one another and angled towards one another. An impedance matching resin material 430 is provided between the material of the pipe 404 and the window of each housing 420 so as to accommodate the angle of the transducers 406, 408. The angled arrangement of the acoustic transducers 406, 408 may mean that a first time of flight for transmission of an acoustic signal from the first transducer 406 to the second transducer 408 is different to a second time of flight for transmission of an acoustic signal from the second transducer 408 to the first transducer 406 according to a flow velocity of a fluid in the fluid flow path 410. This may permit the flow velocity of a fluid in the fluid flow path 410 to be determined from measurements of the first and second times of flight.

Figure 7:
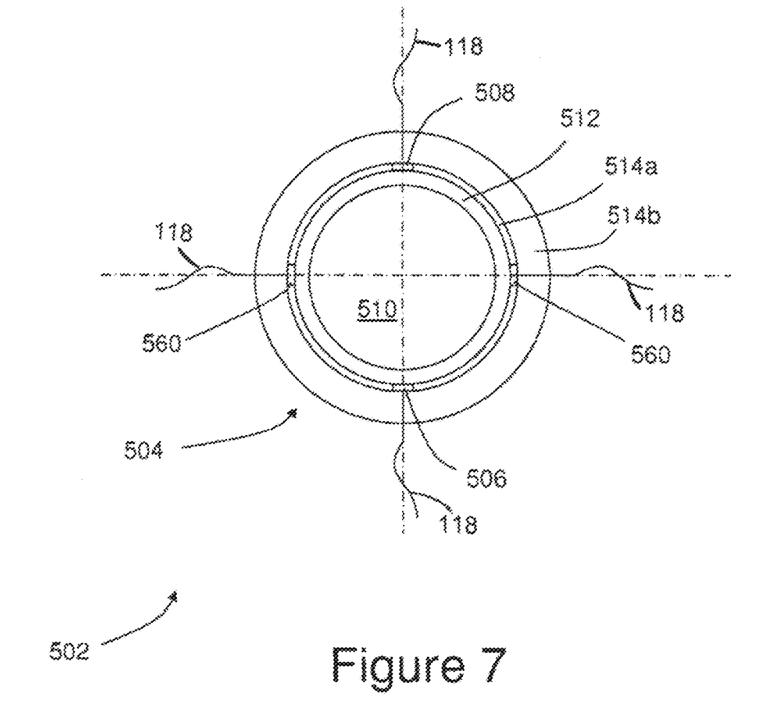
FIG. 7 is a schematic lateral cross-section of a fifth alternative fluid sensor.

FIG. 7 shows a fifth alternative fluid sensor 502 which shares many like features with the fluid sensor 2 described with reference to FIGS. 1(*a*), 1(*b*) and 2. As such, the features of the fifth alternative fluid sensor 502 shown in FIG. 7 have the same reference numerals as the corresponding features of the fluid sensor 2 of FIGS. 1(*a*), 1(*b*) and 2 incremented by "500". Like the fluid sensor 2, the fluid sensor 502 includes a fluid conduit in the form of a pipe 504 which defines a fluid flow path 510 internally thereof. The pipe 504 comprises a PEEK sleeve 512 and an inner layer 514a of composite material comprising carbon fibres embedded in a PEEK matrix material formed around the PEEK sleeve 512.

Like the fluid sensor 2, the fluid sensor 502 also includes a transmitting ultrasonic transducer 506 and a primary receiving ultrasonic transducer 508. The transducers 506, 508 are located externally of the fluid flow path 510. However, unlike the fluid sensor 2, the fluid sensor 502 also includes secondary receiving ultrasonic transducers 560 which are also located externally of the fluid flow path 510 at different positions around the circumference of the base pipe 504.

At least part of the thickness of the inner layer 514a of composite material defines a composite region between the PEEK sleeve 512 and each of the transducers 506, 508, 560.

The fluid sensor 502 also includes an outer layer 514b of composite material which is located externally of the inner layer 514a of composite material and which comprises a PEEK matrix and one or more carbon fibre reinforcing elements embedded within the PEEK matrix. The outer layer of composite material 514b is located externally of the transducers 506, 508 and 560.

In use, the secondary receiving ultrasonic transducers 560 may be used to receive scattered acoustic waves indicative of bubbles or pockets of gas in a fluid present in or flowing through the fluid flow path 510, indicative of particulates in a fluid present in or flowing through the fluid flow path 510, and/or indicative of variations in the composition or distribution of a fluid present in or flowing through the fluid flow path 510.

Figure 8:
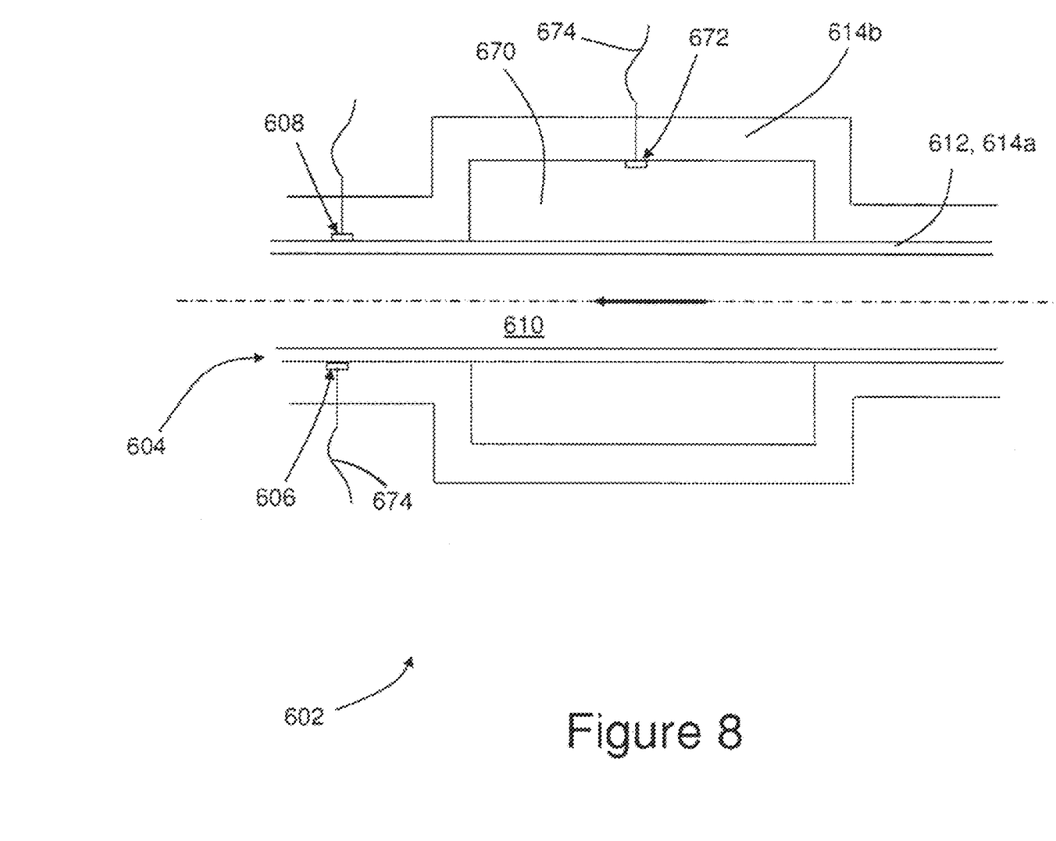
FIG. 8 is a schematic longitudinal cross-section of a sixth alternative fluid sensor.

FIG. 8 shows a sixth alternative fluid sensor 602 which shares many like features with the fluid sensor 2 described with reference to FIGS. 1(a), 1(b) and 2. As such, the features of the sixth alternative fluid sensor 602 shown in FIG. 8 have the same reference numerals as the corresponding features of the fluid sensor 2 of FIGS. 1(a), 1(b) and 2 incremented by "600". Like the fluid sensor 2, the fluid sensor 602 includes a fluid conduit in the form of a pipe 604 which defines a fluid flow path 610 internally thereof. The pipe 604 comprises a PEEK sleeve 612 and an inner layer 614a of composite material. Like the fluid sensor 2, the fluid sensor 602 also includes a transmitting ultrasonic transducer 606 and a receiving ultrasonic transducer 608. The transducers 606, 608 are mounted on the pipe 604. At least part of the thickness of the inner layer 614a of composite material defines a composite region between the PEEK sleeve 612 and each of the transducers 606, 608.

The fluid sensor 602 further includes a PEEK cavity filler member 670 and a composite cavity member 614b which comprises a PEEK matrix and one or more carbon fibre reinforcing elements embedded within the PEEK matrix. The fluid sensor 602 includes a patch antenna 672 located between the PEEK cavity filler member 670 and the composite cavity member 614b. The composite cavity member 614b is located externally of the, the transducers 606, 608, the PEEK cavity filler member 670 and the patch antenna 672. The patch antenna 672 is electrically isolated from composite cavity member 614. An electrical connection is provided to the patch antenna 672 by an insulated electrical cable 674. In use, the composite cavity member 614 defines a resonant cavity for a RF electromagnetic field internally thereof. Such a fluid sensor 602 may permit electromagnetic measurements to be performed on a fluid present in the fluid flow path 610 in addition to acoustic measurements performed on the fluid using the transducers 606, 608. Such electromagnetic measurements may permit additional properties of the fluid present in the fluid flow path 610 to be determined.

One skilled in the art will appreciate that various modifications may be made to any of the fluid sensors described with reference to FIGS. 1 to 8. For example, the number and/or the arrangement of acoustic transducers may be different to the number and/or arrangement of acoustic transducers shown in FIGS. 1 to 8. One or more of the transducers may be configured to receive or detect at least one of an acoustic wave or an acoustic signal transmitted in, by or through a fluid present the fluid flow path. One or more of the transducers may be configured to receive or detect a pressure of a fluid present the fluid flow path. One or more of the transducers may be configured to receive or detect a variation in a pressure of a fluid present the fluid flow path. One or more of the transducers may be configured to receive or detect a strain, or a variation in strain, within a wall of the fluid conduit or pipe.

It may not be necessary to provide a compliant filler material between the housing of the acoustic transducer and the material of the wall of the pipe or between the housing of the acoustic transducer and the outer layer of composite material. During formation of the outer layer of composite material, the PEEK material of the PEEK filler member and the PEEK material of the wall of the pipe may melt and fuse together thereby avoiding the formation of any voids around the PEEK filler member 40.

One or more of the transducers may be partially or fully embedded in the pipe wall. The one or more of the transducers may be located partially or fully within a recess formed in the pipe wall.

One or more of the transducers may be located partially or fully in angled recesses formed in the pipe wall. Such angled recesses may be formed at predetermined locations and angles which are selected for the transmission of acoustic waves between transducers across the fluid flow path.

The fluid flow path may have a circular or a non-circular cross-section.

The transmitting and receiving transducers may be located at the same axial position relative to an axis of the pipe. However, rather than being arranged diametrically opposite one another on different sides of the fluid flow path for the transmission of acoustic waves therebetween across a diameter defined across the fluid flow path, the transmitting and receiving transducers may be angled towards one another for the transmission of acoustic waves along a chord defined across the fluid flow path.

Although all of the fluid sensors described above include a fluid conduit having a wall which comprises a composite region between an acoustic transducer and a fluid flow path, it should be understood that in a variant of any of the fluid sensors described above, the recesses which accommodate the acoustic transducers may extend all of the way through the inner composite layer into the PEEK sleeve. In such fluid sensor variants, homogeneous PEEK material extends from the fluid flow path to the acoustic transducer.

The invention claimed is:

1. A fluid sensor comprising:
a fluid conduit having a wall defining a fluid flow path; and
an acoustic transducer located externally of the fluid flow path,
wherein the wall of the fluid conduit comprises a composite region between the acoustic transducer and the fluid flow path, the composite region comprising a composite material including a polymer matrix material and one or more reinforcing elements embedded within the polymer matrix material wherein the wall of the fluid conduit comprises a homogeneous region between the fluid flow path and the composite region, wherein the homogeneous region comprises the polymer matrix material and is substantially devoid of reinforcing elements and wherein the one or more reinforcing elements are substantially electrically non-conductive.

2. A fluid sensor according to claim 1, wherein the composite region is thinner than the homogeneous region.

3. A fluid sensor according to claim 2, wherein the fluid conduit comprises a homogeneous base member formed from the polymer matrix material.

4. A fluid sensor according to claim 3, wherein the fluid conduit comprises an inner layer of composite material located externally of the base member.

5. A fluid sensor according to claim 1, wherein the acoustic transducer is mounted on or supported by the fluid conduit.

6. A fluid sensor according to claim 1, wherein the acoustic transducer is partially or fully embedded in the fluid conduit.

7. A fluid sensor according to claim 1, wherein the fluid conduit defines a recess and the acoustic transducer is located partially or fully within the recess.

8. A fluid sensor according to claim 1, comprising an impedance matching material, resin or gel located between the fluid conduit and the acoustic transducer.

9. A fluid sensor according to claim 1, wherein the fluid conduit comprises an outer layer of composite material located externally of the transducer, the composite material comprising a polymer matrix material and one or more reinforcing elements embedded within the polymer matrix material.

10. A fluid sensor according to claim 9, wherein the composite material of the outer layer of composite material comprises the same composite material as the composite region of the fluid conduit.

11. A fluid sensor according to claim 4, wherein the outer layer of composite material is located externally of the inner layer of composite material.

12. A fluid sensor according to claim 9, comprising a stiff, rigid and/or non-compliant filler member.

13. A fluid sensor according to claim 12, wherein the filler member comprises the polymer matrix material.

14. A fluid sensor according to claim 12, wherein the filler member is located between the transducer and the fluid conduit.

15. A fluid sensor according to claim 12, wherein the filler member is located between the transducer and the outer layer of composite material.

16. A fluid sensor according to claim 1, comprising a compliant filler material, potting compound, resin or gel located between the transducer and the fluid conduit.

17. A fluid sensor according to claim 1, wherein the acoustic transducer comprises a layer of piezo-electric material.

18. A fluid sensor according to claim 17, wherein the polymer matrix material has an acoustic impedance which is intermediate an acoustic impedance of the piezo-electric material and an acoustic impedance of crude oil or water.

19. A fluid sensor according to claim 17, wherein the acoustic transducer comprises a front layer on a front face of the layer of piezo-electric material between the piezo-electric material and the fluid conduit, the front layer having a thickness comparable to a quarter of a wavelength at an acoustic operating frequency of the acoustic transducer.

20. A fluid sensor according to claim 19, wherein the front layer has an acoustic impedance which is intermediate an acoustic impedance of the piezo-electric material and an acoustic impedance of the polymer matrix material.

21. A fluid sensor according to claim 1, wherein a thickness of the wall of the fluid conduit between the fluid flow path and the acoustic transducer is comparable to a quarter of a wavelength at an acoustic operating frequency of the acoustic transducer.

22. A fluid sensor according to claim 1, wherein the polymer matrix material comprises at least one of a thermoplastic material and a thermoset material.

23. A fluid sensor according to claim 1, wherein the polymer matrix material comprises at least one of a polyaryl ether ketone, a polyaryl ketone, a polyether ketone (PEK), a polyether ether ketone (PEEK), a polycarbonate, polyvinyl chloride (PVC), a polyamide, polyamide 11 (PA11), polyvinylidene fluoride, polyvinylidene difluoride (PVDF), polyphenylene sulphide (PPS), polyethylenimines (PEI), polyoxymethylene (POM), acetal, a setting resin, a polymeric resin, and an epoxy resin.

24. A fluid sensor according to claim 1, wherein the one or more reinforcing elements comprise at least one of aramid fibres, glass fibres, basalt fibres and carbon fibres.

25. A fluid sensor according to claim 1, wherein at least one of the one or more reinforcing elements is aligned at a predetermined angle relative to a longitudinal axis of the fluid conduit.

26. A fluid sensor according to claim 1, wherein at least one of the one or more reinforcing elements is aligned at a positive angle relative to a first longitudinal axis of the base member and at least one of the one or more reinforcing elements is aligned at a negative angle relative to a second longitudinal axis of the fluid conduit.

27. A fluid sensor according to claim 1, wherein at least one of the one or more reinforcing elements is aligned parallel to, or circumferentially relative to, a longitudinal axis of the fluid conduit.

28. A fluid sensor according to claim 1, comprising a plurality of acoustic transducers located externally of the fluid flow path.

29. A fluid sensor according to claim 28, wherein at least one of the acoustic transducers is configured to transmit acoustic energy and at least one of the acoustic transducers is configured to receive acoustic energy.

30. A method of sensing a property of a fluid, comprising:
receiving an acoustic wave through a composite region of a wall of a fluid conduit from a fluid flow path defined by the wall,
wherein the composite region comprises a composite material including a polymer matrix material and one or more reinforcing elements embedded within the polymer matrix material, wherein the wall of the fluid conduit comprises a homogeneous region between the fluid flow path and the composite region, wherein the homogeneous region comprises the polymer matrix material and is substantially devoid of reinforcing elements and wherein the one or more reinforcing elements are substantially electrically non-conductive.

31. A method according to claim 30, comprising:
transmitting the acoustic wave through the composite region of the wall of the fluid conduit to the fluid flow path.

32. A method of manufacturing a fluid sensor comprising:
providing a fluid conduit having a wall defining a fluid flow path; and
providing an acoustic transducer externally of the fluid flow path,
wherein the wall of the fluid conduit comprises a composite region between the acoustic transducer and the fluid flow path, and the composite region comprises a composite material including a polymer matrix material and one or more reinforcing elements embedded within the polymer matrix material, wherein the wall of the fluid conduit comprises a homogeneous region between the fluid flow path and the composite region, wherein the homogeneous region comprises the polymer matrix material and is substantially devoid of reinforcing elements and wherein the one or more reinforcing elements are substantially electrically non-conductive.

33. A method according to claim 32, comprising:
forming a recess in the fluid conduit; and
locating the transducer in the recess.

34. A method according to claim 32, comprising forming an outer layer of composite material on or over the transducer, the composite material comprising a polymer matrix material and one or more reinforcing elements embedded within the polymer matrix material.

35. A method according to claim 34, wherein the composite material of the outer layer of composite material comprises the same composite material as the composite region of the fluid conduit.

36. A method according to claim 34, comprising locating a filler member externally of the transducer.

37. A method according to claim 36, wherein the filler member comprises the polymer matrix material.

38. A method according to claim 36, comprising forming the outer layer of composite material on or over the filler member.

39. A method according to claim 36, comprising applying a compliant filler material to at least one of the transducer, the fluid conduit and the filler member.

* * * * *